United States Patent [19]

Pineda

[11] Patent Number: 5,347,768

[45] Date of Patent: Sep. 20, 1994

[54] ROOFING SYSTEM AND METHOD

[76] Inventor: Yolanda Pineda, 12235 SW. 17th La., Unit Q105, Miami, Fla. 33175

[21] Appl. No.: 76,167

[22] Filed: Jun. 14, 1993

[51] Int. Cl.$^5$ .................................................. E04B 7/00
[52] U.S. Cl. ............................................ 52/23; 52/3; 52/DIG. 11
[58] Field of Search ................ 52/3, 5, 408, 410, 520, 52/521, 543, 90.1, 11, 15, 902, DIG. 11, 4, 23

[56] References Cited

U.S. PATENT DOCUMENTS

| | | | |
|---|---|---|---|
| 2,002,206 | 5/1935 | Kobe | 52/553 |
| 2,004,198 | 6/1935 | Fall | 52/553 |
| 2,136,192 | 11/1938 | Kane | 52/3 |
| 2,634,463 | 4/1953 | Jarvie | 52/553 |
| 2,648,103 | 8/1953 | Wahlfeld | 52/553 |
| 3,006,113 | 10/1961 | Barnes et al. | 52/553 |
| 3,098,322 | 7/1963 | Greene | 52/96 |
| 3,426,488 | 2/1969 | Stanford | 52/15 |
| 3,774,364 | 11/1973 | Johnson | 52/509 |
| 4,015,376 | 3/1977 | Gerhardt | 52/23 |
| 4,122,637 | 10/1978 | Runge et al. | 52/3 |
| 4,217,742 | 8/1980 | Evans | 52/553 |
| 4,283,888 | 8/1981 | Cros | 52/3 |
| 4,858,395 | 8/1989 | McQuick | 52/3 |
| 4,890,427 | 1/1990 | Rayburn | 52/90.2 |

*Primary Examiner*—Carl D. Friedman
*Assistant Examiner*—Creighton Smith
*Attorney, Agent, or Firm*—Jordan M. Meschkow; Lowell W. Gresham; Don J. Flickinger

[57] ABSTRACT

A roof having an underlayment of sheathing attached to rafters and a group of discrete roofing elements attached to and substantially covering the underlayment. The roof also includes a net having an open weave and a multiplicity of openings. The openings are smaller than at least one dimension of the discrete roofing elements. The net is secured to the roof in contact with the group of discrete roofing elements and covers at least a portion thereof.

17 Claims, 1 Drawing Sheet

ROOFING SYSTEM AND METHOD

BACKGROUND OF THE INVENTION

1. Field of the Invention

This invention relates to a method and device for roofing protection and improvements in roofing integrity.

More particularly, the present invention relates to a system and method for containing roofing elements in highly inclement weather and increasing roof robustness with respect to weatherborne water.

In a further and more specific aspect, the instant invention concerns a method and apparatus for containing roofing elements in periods of high wind, avoiding or reducing probability of injury to persons or objects by windborne roofing elements.

2. Prior Art

Roofs of great variety in construction and purpose are often employed for housing, garages, airports, mercantile establishments, religious, educational and other public and private institutions and meeting places. Typically, a roof comprises an underlayment, a membrane and roofing elements such as asphalt and other types of shingles, tiles, wooden shakes, slate or sheet metal pieces and the like, with the roofing elements placed in a fashion intended to reduce both wind stress thereon and leakage of rainwater, snowmelt and the like therethrough. Typically, roofs including pluralities of discrete roofing elements incorporate such roofing elements placed in rows across a roof and held in place by fasteners placed along a top edge. The fasteners along the top edge of the row of roofing elements pose a threat of water leakage because the fasteners penetrate the thickness of the roofing elements in order to secure them to the underlayment.

Accordingly, it is often necessary to overlap the top edge of a first or lower row of roofing elements with a bottom edge of a second or upper row of roofing elements immediately above the first row of roofing elements. This arrangement avoids exposing the fastener and any hole through the roofing element to accommodate the fastener to the elements.

A problem which has been encountered with such approaches is a tendency for the bottom edges of the second or upper row of roofing elements to be exposed to shearing forces and lifting forces in inclement weather conditions because these bottom edges are lifted or canted out from the underlayment. This tendency is exacerbated by weathering, warping of the underlayment, cracking or other deformation of the roofing elements, nesting activities of birds and other animals and other influences which occur over the years of expected service of a roof. These varied weathering and/or ageing effects lead to at least two distinct problems.

A first problem is that the integrity of the roof with respect to weather-related precipitated moisture, in the form of rain, sleet, snow and the like, is compromised. Leakage of moisture through roofs causes damage to interior structures, appliances, decorations and the like and also threatens the structural integrity of the building by allowing water into areas not designed to accommodate moisture. Additionally, the presence of unwanted moisture comprises a nuisance in some areas and a danger in others. For example, it is extremely undesirable to have electrical wiring exposed to uncontrolled amounts of moisture. Such exposure of electrical wiring poses serious risk of electrical shock and/or electrocution and also may engender likelihood of fire.

A second problem is that roofing elements may detach from the roof and become windborne, especially in the event of high winds such as those accompanying and surrounding such natural phenomena as whirlwinds, Chinook winds, tornadoes, cyclones and hurricanes. Such windborne roofing elements become projectiles and may move with considerable velocity in high winds. Areas frequently subject to high winds tend to incorporate heavier materials, e.g., clay or cement tiles or slate, which, when airborne or windborne provide projectiles having considerable destructive potential. When such projectiles intercept a target such as a parked car, a pet or a human being, great damage may be done to the target.

Further, the roofing elements displaced from a roof during natural catastrophes such as the Hurricane Andrew which devastated much of Florida in 1992 pose risks and hazards even after shattering or otherwise coming to rest. These may cause vehicles such as emergency vehicles to skid or to lose air pressure in one or more tires and also provide uncertain footing, especially if present in large numbers.

Accordingly, it is desirable to reduce the likelihood that roofing elements will detach from a roof, even in the event of storms or related natural catastrophes of unusual strength or fury.

Further, some form of water penetration protection for a roof in which some roofing elements have been displaced from their intended positions is strongly desirable.

In order to combat these varied problems, some form of containing structure for roofing elements which does not detract from the aesthetic appearance of the building and is not unsightly is highly desirable. It is also extremely desirable to provide protection against moisture penetration which is not vulnerable to damage to the primary roofing structure as well.

The prior art has also provided variations of the above described apparatus for shedding weather-related precipitated moisture and also has provided sheaths, etc., for protecting structures such as walls and greenhouses.

For example, U.S. Pat. No. 4,283,888 entitled "Method And A Covering For Heat Insulation And Protection Of A Construction", issued on Aug. 18, 1981 to Jacques Cros, describes a method and apparatus "for heat insulating and protecting roofed structures such as residential houses and greenhouses against the action of wind and rain. The exterior of the structure is provided with a covering constituted by interlaced threads of mineral fibers assembled together and preferably by a knitted fabric of glass fiber threads. In the case of a house, the roof and walls are covered in such a manner as to leave a free air space between the covering, the roof or the walls."

A disadvantage of this approach includes the appearance imbued to the home, for example, by covering the home with an envelope of fiberglass. A further disadvantage is the tendency of large sheets of material to act as a sail in high winds, catching the wind and wreaking havoc on and with the covering.

Another example is described in U.S. Pat. No. 2,136,192 entitled "Greenhouse", issued on Nov. 8, 1928 to J. H. Kane, which describes a wire guard spaced from a fragile surface, such as a greenhouse, by means of ribs formed therein, for the purpose of enabling the guard to yield toward the surface and thereby to absorb the force of an impact as accomplished by the invention described therein. Again, the disadvantages of conspicuous covering and exposure to winds are present in the invention as described in the above-noted patent.

While the various mentioned prior art devices function as apparatus for reducing hail damage to greenhouses, for example, certain inherent deficiencies preclude adequate, satisfactory performance for either the purpose of retaining heavier roofing elements in high winds or the purpose of reducing or eliminating moisture penetration in light of damage to the roofing elements of a primary roofing structure.

It would be highly advantageous, therefore, to remedy the foregoing and other deficiencies inherent in the prior art.

Accordingly, it is an object of the present invention to provide improvements in roofing structures incorporating discrete roofing elements.

Another object of the present invention is the provision of an improved roofing structure having increased resistance to weather precipitated moisture.

And another object of the present invention is to provide an improved method for roof construction particularly relevant to roofs employing individual roofing tiles or slate pieces.

Still another object of the present invention is the provision of a novel method for containing roofing tiles and the like even in the presence of severe weather including high winds.

Yet another object of the instant invention is to provide a method for reducing water penetration into buildings through roofs.

Yet still another object of the instant invention is the provision of a method for increasing water resistance of roofs even in the presence of damage to the roof.

And a further object of the invention is to provide an apparatus for reducing likelihood of delamination and subsequent projectile action of roofing elements from roofs in highly inclement weather.

Still a further object of the immediate invention is the provision of an apparatus for increasing robustness of moisture protection of buildings.

Yet a further object of the invention is to provide an apparatus for an improved roof and method for containing roofing tiles and the like employed therein.

And still a further object of the invention is the provision of method and apparatus, according to the foregoing, which is intended to reduce moisture penetration of roofs whilst capturing roofing elements against wind action.

SUMMARY OF THE INVENTION

Briefly, to achieve the desired objects of the instant invention in accordance with a preferred embodiment thereof, provided is a method for securing roofing elements attached to a roof against wind. The method includes steps of providing a netting material having a mesh smaller than at least one dimension of the roofing elements, covering at least a portion of a top surface of the roof including the roofing elements with the netting material and securing the netting to the roof against and in contact with the roofing elements.

The method desirably but not essentially includes providing sheeting beneath the roof. The sheeting is inclined at an angle and includes a lower edge. The method further desirably but not essentially includes steps of providing guttering and attaching the guttering along the lower edge of the sheeting. The guttering entrains water impingent upon the sheeting and diverts the water to suitable disposal.

Also provided is an apparatus for a roof. The roof includes an underlayment or sheathing attached to rafters, a group of separate roofing elements attached to the underlayment and substantially covering the underlayment and a net having an open weave. The openings are smaller than at least one dimension of the separate roofing elements. The net is secured to the roof and covers at least a portion thereof.

The apparatus for a roof further desirably but not essentially includes a continuous sheet of material disposed beneath the underlayment. The continuous sheet of material is inclined at an angle.

The apparatus for a roof further desirably but not essentially includes a gutter disposed along and coupled to a lower edge of the continuous sheet of material. The gutter collects moisture incident or impingent upon the continuous sheet of material. A downspout is attached to the gutter. The downspout disposes of the collected moisture from the gutter.

Also contemplated by the instant invention is an apparatus for roof having a plurality of separate roofing elements attached thereto. The apparatus includes a net having an open weave. The openings are smaller than at least one dimension of the discrete roofing elements. The net is secured to the roof and covers at least a portion thereof.

BRIEF DESCRIPTION OF THE DRAWINGS

The foregoing and further and more specific objects, features and advantages of the instant invention will become readily apparent to those skilled in the art from the following detailed description of preferred embodiments thereof taken in conjunction with the drawings in which.

DETAILED DESCRIPTION OF THE PREFERRED EMBODIMENT

Figure 1:
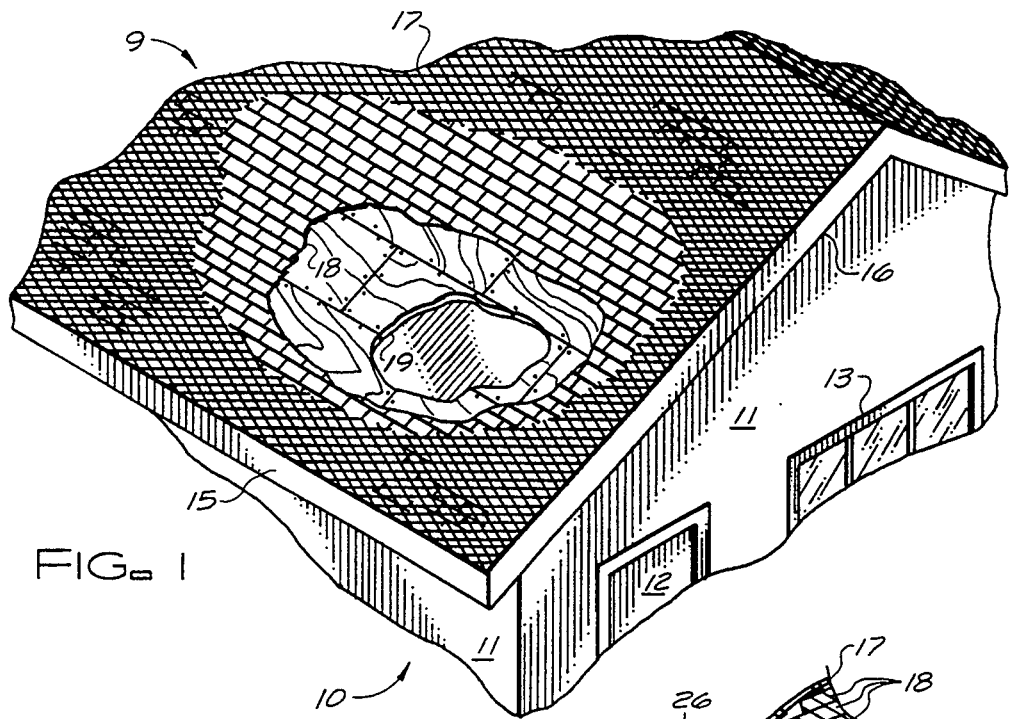
FIG. 1 is an illustration of a portion of a building and roof, in accordance with the teachings of the instant invention.

Turning now to the drawings, in which like reference characters indicate corresponding elements throughout the several views, attention is first directed to FIG. 1 which illustrates a portion of a building and roof 9 in accordance with the teachings of the instant invention and generally designated by the reference character 10. In accordance with the configuration chosen for purposes of illustration, building 10 includes structures and appurtenances commonly found on or in association with building structures. These include walls 11, door 12 in wall 11 and windows 13 through wall 11.

Walls 11 are surmounted by roof 9, illustrated as a slanted roof in accordance with the present invention. Roof 9 is desirably surrounded by fascia 15 along horizontal runs and fascia 16 along inclined runs. Fascia 15 conceals guttering 35 (not shown in FIG. 1), discussed in association with FIG. 3, infra.

Roof 9 is illustrated as a roof for a conventional home, but, in contrast to standard practice, includes an outer layer of netting material 17 covering shingles 18. Shingles 18 cover sheathing 19, which may be plywood sheathing, placed upon rafters (not illustrated in FIG. 1) in accordance with roofing practices known in the art. It will be appreciated that other forms of sheathing may be employed for sheathing 19 in accordance with practices and building codes in effect in the area where home 10 is located or is to be constructed.

It will be appreciated that other arrangements for providing ingress, egress and outdoor access including ventilation and lighting may be employed and that any conventional building structure having a roof 9 may be protected and rendered more robust in view of weather by the instant invention. The present invention is particularly suited to sloped roofs 9 and is especially suited to sloped roofs 9 incorporating discrete roofing elements 18 such as shingles including asphalt shingles, tiles, slates, cedar shakes and the like.

The function of netting material 17 is at least twofold: (1) to secure roofing elements 18 against sheathing 19 and any membrane associated therewith and (2) to prevent roofing elements 18 from becoming windborne in event of foul weather and thereby initially forming airborne projectiles and subsequently forming debris.

It will be appreciated that netting material 17 is illustrated as having a relatively open weave and desirably comprises an interlocking open weave such as is found in wire mesh fencing such as chain link fencing material, for example. In this embodiment, netting material 19 may comprise wire mesh fencing or a lighter, more flexible analog fashioned of plastic, for example, and may manufactured in a wide variety of configurations for differing applications. An expanded sheet of plastic or painted metal, for example, may provide netting material 19 in a variety of colors for color coordination with walls 11 and/or roofing elements 18.

Expanded sheets of plastic or metal are readily fashioned by placing a series of adjacent slits in rows in the sheet of material such that adjacent rows of slits overlap without the slits intersecting one another. The sheet of material is then typically expanded by pulling along an axis at an angle (usually a right angle) to the long axis of the slits.

In an alternative embodiment, netting material 17 may comprise a loosely woven rope mesh or a rope mesh fastened by interlocking loops or knots. Ropes comprising such a rope mesh may be provided in a variety of colors for purpose of aesthetic appeal and color coordination with the building and surrounding area in order to provide an architectonic result.

It will be appreciated that a variety of distinct materials may be provided for netting material 17. A least five characteristics desired for netting material 17 include (i) a relatively open weave (ii) having openings or meshes smaller than roofing elements 18 and (iii) having sufficient strength to withstand wind forces, that (iv) netting material 17 be secured against roofing elements 18 and not suspended above or spaced apart from roofing elements 18 in order to reduce wind loading of netting material 17 and that (v) netting material 17 envelop and enclose roofing elements 18 substantially entirely on the outside or upper surface thereof.

Figure 2:
FIG. 2 is an enlarged detailed view, in cross-section, of a portion of the roof of the building of FIG. 1.

Directing attention now to FIG. 2, an enlarged detailed view, in cross-section, of portion 22 of roof 9 of building portion 10 of FIG. 1 is illustrated. Portion 22 comprises netting material 17 disposed atop roofing elements 18, shown for purpose of illustration in the form of cedar shakes or shingles in FIG. 2.

Alternatively, roofing elements 18 are usefully clay roofing tiles, slate or other roofing materials supplied in the form of discrete roofing elements. Roofing elements 18 are coupled to underlayment 19, disposed at an angle with respect to the horizontal as illustrated in FIG. 2.

Netting material 17 is desirably secured over roofing elements 18 by bolts 26 having washers 27 between heads of bolts 26 and netting material 17. Bolts 26 usefully penetrate roofing elements 18 and underlayment 19 and are captured thereagainst by washers 30 and nuts 31 threadedly engaged with bolts 26. It will be appreciated that many, diverse techniques may be employed for securing netting material 17 and that these are intended to be encompassed in the present invention. Sheeting 25 is disposed beneath underlayment 19 and is discussed further in association with FIG. 3, infra.

Figure 3:
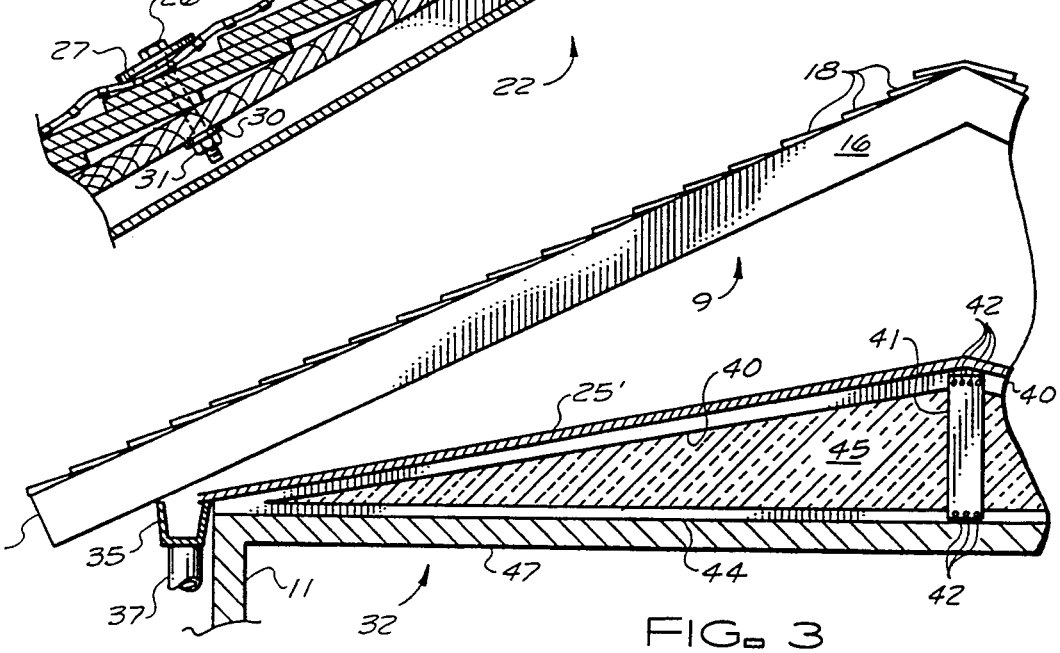
FIG. 3 is a further side view, in cross-section, of a portion of a first preferred embodiment of the roof, ceiling and walls of the building of FIG. 1.

Referring now to FIG. 3, a further side view, in cross-section, of a portion generally designated by the reference character 32 of a first preferred embodiment of roof 9, ceiling 47 and walls 11 associated with building portion 10 of FIG. 1 is depicted. Portion 32 includes walls 11 and ceiling 47 of a building such as building 10 of FIG. 1, having a superstructure comprising lower frame 44, upper frame 40 together with bracing 41 attached to lower frame 44 and upper frame 40 by fasteners 42. Lower frame 44, upper frame 40 and bracing 41 may comprise wooden boards or timbers coupled together by fasteners 42 such as nails or screws, as is known in the construction industry, for example.

Alternatively, and as is becoming increasingly common in modern construction practice, lower frame 44, upper frame 40 and bracing 41 may comprise metal studs such as steel studs, joined by fasteners 42 such as screws. This construction technique employing such materials may be preferred for such diverse reasons as materials cost, weight, fire resistance and lack of combustibility, materials availability and/or construction and building codes pertaining in the area in which such a superstructure is to be employed.

In a preferred embodiment, the superstructure also contains insulation 45 for moderating temperatures and heating/air conditioning costs within buildings such as building 10 of FIG. 1. A continuous layer of sheeting material 25', analogous to sheeting 25 of FIG. 2, is disposed above insulation 45 and upper frame 40. Continuous layer of sheeting material 25' may be formed from a series of sheets of material joined together or overlapped to form a barrier to moisture. Continuous layer of sheeting material 25' prevents moisture deposited or impingent on an upper surface of continuous layer of sheeting material 25', as for example, rain deposited on roof 9 of FIGS. 1 and 3 and leaking therethrough onto continuous layer of sheeting material 25'. This is desirable at least because insulation such as insulation 45 is known to lose effectiveness if moist.

Additionally, if roof 9 is damaged as by high winds, etc., continuous layer of sheeting material 25' obviates or avoids penetration of water within buildings such as building 10 of FIG. 1, reducing or eliminating damage to property contained therein and improving the quality of shelter provided thereby to goods and/or people contained within.

The superstructure comprising lower frame 44, upper frame 40, bracing 41, continuous layer of sheeting material 25' and desirably including insulation 45 is located beneath roof 9 (see also FIG. 1), shown in FIG. 3 as including roofing elements 18 and inclined fascia 16. A lower end of inclined fascia 16 abuts horizontal fascia 15. Horizontal fascia 15 desirably conceals or partially conceals guttering 35 and/or downspout 37. Guttering 35 is shown as being coupled to a lower edge of continuous layer of sheeting material 25' such that any moisture from continuous layer of sheeting material 25' is collected by guttering 35 and delivered to downspout 37. Downspout 37 guides collected water or moisture from gutter 35 and deposits such water away from roof 9. The combination of continuous layer of sheeting material 25', gutter 35 and downspout 37 thus provides additional protection from moisture for insulation 45, walls 11 and ceiling 47. These elements additionally act together in concert to prevent moisture from penetrating into the interior of the building, even in the event that the degree of protection from moisture invasion provided by roof 9 is compromised, as for example, by loss of one or more of roofing elements 18.

By now it should be appreciated that an improved method and apparatus suitable for new building construction and also adapted to modification of existing structures have been provided in accordance with the present invention. The method and apparatus have certain advantages and provide improved performance of roofs. Likelihood of loss of tiles, shakes and the like from action of strong winds and the attendant risks which windborne debris therefrom pose have been reduced.

As well, robustness of resistance to moisture penetration into buildings having roofs in accordance wish the present invention is improved, providing likelihood of increased comfort and reduced loss, expense and/or hazard in the event of compromise or loss of roof integrity.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A method for securing roofing elements coupled to a roof against wind, said method comprising steps of:
providing a netting material having a mesh smaller than at least one dimension of said roofing elements;
covering at least a portion of a top surface of said roof including said roofing elements with said netting material; and
securing said netting material to said roof against and in contact with said roofing elements.

2. The method as claimed in claim 1, wherein there is further included a step of providing sheeting beneath said roof, said sheeting being inclined at an angle such that a lower edge of said sheeting is located substantially at and along an edge of said roof.

3. The method as claimed in claim 2, wherein said step of providing sheeting includes a step of providing metal sheeting having areal dimensions substantially similar to areal dimensions of said roof.

4. The method as claimed in claim 1, wherein said step of providing netting material includes a step of providing netting material comprising chain link fencing material.

5. A method for securing roofing elements coupled to a roof against wind, said method comprising steps of:
providing a netting material having a mesh smaller than at least one dimension of said roofing elements;
covering at least a portion of a top surface of said roof including said roofing elements with said netting material;
securing said netting material to said roof against and in contact with said roofing elements;
providing sheeting beneath said roof, said sheeting being inclined at an angle such that a lower edge of said sheeting is located substantially at and along an edge of said roof;
providing guttering; and
attaching said guttering along a lower edge of said sheeting, said guttering for entraining water impingent upon said sheeting and diverting said water to suitable disposal.

6. A method for securing roofing elements coupled to a roof against wind, said method comprising steps of:
providing a netting material having a mesh smaller than at least one dimension of said roofing elements;
covering at least a portion of a top surface of said roof including said roofing elements with said netting material;
securing said netting material to said roof against and in contact with said roofing elements; and
providing sheeting beneath said roof, said sheeting being inclined at an angle and having a lower edge;
providing guttering; and
attaching said guttering along said lower edge of said sheeting, said guttering for entraining water impingent upon said sheeting and diverting said water to suitable disposal.

7. The method as claimed in claim 6, wherein:
said step of providing sheeting includes a step of providing plastic sheeting; and
said step of providing guttering includes a step of providing plastic guttering.

8. The method as claimed in claim 6, wherein:
said step of providing sheeting includes a step of providing metal sheeting; and
said step of providing guttering includes a step of providing metal guttering.

9. A roof, said roof comprising:
an underlayment comprising sheathing attached to rafters;
a group of discrete roofing elements coupled to said underlayment and substantially covering said underlayment; and
a net comprising an open weave having a mesh of openings, said openings being smaller than at least one dimension of said discrete roofing elements, said net being secured to said roof and covering at least a portion thereof;
a continuous sheet of material disposed beneath said underlayment, said continuous sheet of material being inclined at an angle with respect to a horizontal
a gutter disposed along and coupled to an edge of said continuous sheet of material, said gutter for collecting moisture impingent upon said continuous sheet of material.

10. The apparatus as claimed in claim 9, wherein said gutter is disposed along and coupled to a lower edge of said continuous sheet of material; and further comprising:
- a downspout coupled to said gutter, said downspout for disposal of said collected moisture from said gutter.

11. The apparatus as claimed in claim 9, wherein said gutter is disposed along and coupled to a downward-directed crease in said continuous sheet of material, said gutter for collecting moisture impingent upon said continuous sheet of material; and further comprising:
- a downspout coupled to said gutter, said downspout for disposal of said collected moisture from said gutter.

12. The apparatus as claimed in claim 9, wherein said continuous sheet of material comprises plastic sheeting.

13. The apparatus as claimed in claim 9, wherein said net comprises metal wire configured as a chain link.

14. A roof, said roof comprising:
- an underlayment comprising sheathing attached to rafters;
- a group of discrete roofing elements coupled to said underlayment and substantially covering said underlayment;
- a net comprising an open weave having a mesh of openings, said openings being smaller than at least one dimension of said discrete roofing elements, said net being secured to said roof and covering at least a portion thereof;
- a continuous sheet of aluminum sheeting material disposed beneath said underlayment, said continuous sheet of material being inclined at an angle with respect to a horizontal plane.

15. An apparatus for a roof having a multiplicity of discrete roofing elements attached thereto, said apparatus including a net comprising an open weave having a multiplicity of openings, each opening of said multiplicity of openings being smaller than at least one dimension of said discrete roofing elements, said net being secured to said roof and covering at least a portion thereof;
- a continuous sheet of material disposed beneath said underlayment, said continuous sheet of material inclined at an angle with respect to a horizontal plane;
- a gutter disposed along and coupled to a lower edge of said continuous sheet of material, said gutter for collecting moisture impingent upon said continuous sheet of material; and
- a downspout coupled to said gutter, said downspout for disposal of said collected moisture from said gutter.

16. The apparatus as claimed in claim 15, wherein said net comprises metal wire configured as a chain link.

17. The apparatus as claimed in claim 15, wherein said net comprises plastic netting.

* * * * *

UNITED STATES PATENT AND TRADEMARK OFFICE
CERTIFICATE OF CORRECTION

PATENT NO. : 5,347,768
DATED : September 20, 1994
INVENTOR(S) : Yolanda Pineda

It is certified that error appears in the above-indentified patent and that said Letters Patent is hereby corrected as shown below:

In claim 9, column 8, line 62, insert --plane; and--, after "horizontal".

Signed and Sealed this

Seventeenth Day of January, 1995

Attest:

BRUCE LEHMAN

*Attesting Officer*    *Commissioner of Patents and Trademarks*